US012637972B2

(12) United States Patent
Suzuki

(10) Patent No.: US 12,637,972 B2
(45) Date of Patent: May 26, 2026

(54) AMMONIA ENGINE SYSTEM

(71) Applicant: KABUSHIKI KAISHA TOYOTA JIDOSHOKKI, Kariya (JP)

(72) Inventor: Hideaki Suzuki, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 1 day.

(21) Appl. No.: 18/876,741

(22) PCT Filed: May 29, 2023

(86) PCT No.: PCT/JP2023/019954
§ 371 (c)(1),
(2) Date: Dec. 19, 2024

(87) PCT Pub. No.: WO2023/248725
PCT Pub. Date: Dec. 28, 2023

(65) Prior Publication Data

US 2025/0376941 A1 Dec. 11, 2025

(30) Foreign Application Priority Data

Jun. 24, 2022 (JP) ................................ 2022-101942

(51) Int. Cl.
*F02B 43/10* (2006.01)
*F02M 21/02* (2006.01)

(52) U.S. Cl.
CPC ......... *F02B 43/10* (2013.01); *F02M 21/0206* (2013.01); *F02M 21/0284* (2013.01)

(58) Field of Classification Search
CPC F02B 43/10; F02M 21/0206; F02M 21/0284; F02M 21/02; F02D 19/02; F02D 41/14; C01B 3/04; Y02T 10/30
See application file for complete search history.

(56) References Cited

U.S. PATENT DOCUMENTS 8,464,515 B2 * 6/2013 Aso ........................ F02M 31/18
60/299
2008/0262702 A1 10/2008 Bamba
(Continued)

FOREIGN PATENT DOCUMENTS

JP 2008-267306 A 11/2008
JP 2020-159211 A 10/2020
(Continued)

OTHER PUBLICATIONS

International Search Report for PCT/JP2023/019954 dated Aug. 1, 2023.
Written Opinion for PCT/JP2023/019954 dated Aug. 1, 2023.

*Primary Examiner* — Grant Moubry
(74) *Attorney, Agent, or Firm* — Sughrue Mion, PLLC

(57) ABSTRACT

An ammonia engine system includes a combustor configured to generate combustion gas by burning ammonia mixed with air, a reforming catalyst configured to be warmed up by the combustion gas, an ammonia engine configured to be supplied with hydrogen that is discharged from the reforming catalyst, and a controller. The controller is configured to, during startup of the ammonia engine, execute a combustion process that causes the combustor to generate the combustion gas and a supplying process that supplies the reforming catalyst with ammonia together with air. The controller is configured to initiate the supplying process after the combustion process has begun.

4 Claims, 4 Drawing Sheets

(56) References Cited

U.S. PATENT DOCUMENTS

| | | | | |
|---|---|---|---|---|
| 2011/0259290 | A1* | 10/2011 | Michikawauchi | F02D 19/0692 123/1 A |
| 2011/0283959 | A1* | 11/2011 | Aso | F01N 3/30 123/3 |
| 2012/0167840 | A1 | 7/2012 | Miyagawa et al. | |
| 2022/0268200 | A1* | 8/2022 | Seba | F01N 3/36 |

FOREIGN PATENT DOCUMENTS

| | | | |
|---|---|---|---|
| JP | 2022-029148 | A | 2/2022 |
| WO | 2012/090739 | A1 | 7/2012 |
| WO | 2022/049870 | A1 | 3/2022 |

* cited by examiner

AMMONIA ENGINE SYSTEM

CROSS-REFERENCE TO RELATED APPLICATIONS

This application is national stage application of International Application No. PCT/JP2023/019954, filed on May 29, 2023, which designates the United States, and which claims the benefit of priority from Japanese Patent Application No. 2022-101942, filed on Jun. 24, 2022, the entire contents of which is incorporated herein by reference.

TECHNICAL FIELD

The present disclosure relates to an ammonia engine system.

BACKGROUND

Patent Literature 1 discloses an ammonia engine system that includes a reforming catalyst and an ammonia engine. When the reforming catalyst is supplied with air and ammonia and the reforming catalyst reaches a temperature at which reforming is possible, a reforming reaction occurs within the reforming catalyst. The hydrogen discharged from the reforming catalyst through the reforming reaction is supplied to the ammonia engine.

The above-described ammonia engine system may be equipped with a combustor. In this case, the combustor generates combustion gas by burning ammonia mixed with air. The reforming catalyst can be warmed up by the combustion gas generated in the combustor.

CITATION LIST

Patent Literature

Patent Literature 1: International Publication No. 2012/090739

SUMMARY OF INVENTION

Technical Problem

For example, when the supply of air and ammonia to the reforming catalyst begins at the startup of the ammonia engine, the reforming reaction in the reforming catalyst does not occur until the reforming catalyst reaches a temperature at which reforming is possible. Thus, the ammonia supplied to the reforming catalyst is discharged from the reforming catalyst without being consumed by the reforming catalyst. It is desirable to reduce the volume of ammonia discharged from the reforming catalyst in this manner.

Solution to Problem

An ammonia engine system according to an aspect of the present disclosure includes a combustor configured to generate combustion gas by burning ammonia mixed with air, a reforming catalyst configured to be warmed up by the combustion gas, an ammonia engine configured to be supplied with hydrogen that is discharged from the reforming catalyst, and a controller. The controller is configured to, during startup of the ammonia engine, execute a combustion process that causes the combustor to generate the combustion gas and a supplying process that supplies the reforming catalyst with ammonia together with air. The controller is configured to initiate the supplying process after the combustion process has begun.

DESCRIPTION OF EMBODIMENTS

An embodiment of an ammonia engine system will now be described with reference to the drawings.

Schematic Configuration of Ammonia Engine System

Figure 1:
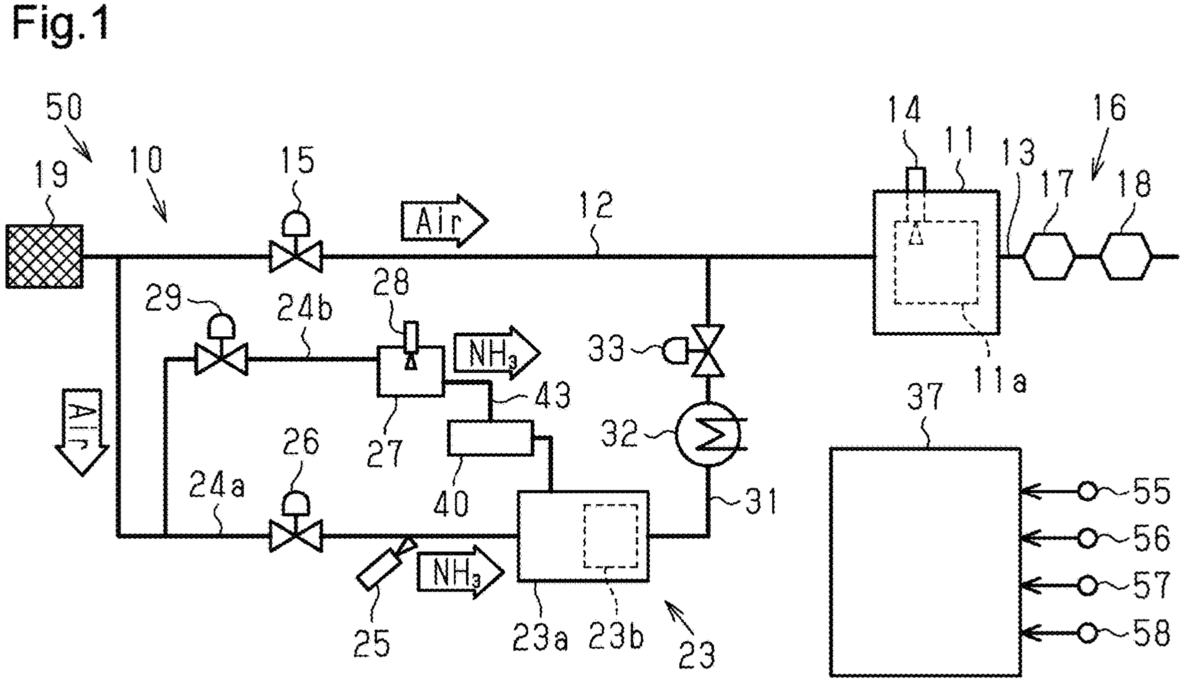
FIG. 1 is a schematic diagram of an ammonia engine system according to an embodiment.

As shown in FIG. 1, an ammonia engine system 10 includes an ammonia engine 11. The ammonia engine system 10 may be mounted on an engine-powered vehicle 50. The ammonia engine 11 uses ammonia ($NH_3$) gas as fuel. The ammonia engine 11 includes a combustion chamber 11*a*. The ammonia engine 11 is a multi-cylinder engine. The ammonia engine 11 is, for example, a four-cylinder engine.

The ammonia engine system 10 includes an intake passage 12, an air cleaner 19, a main injector 14, and a main throttle valve 15. Air is introduced into the combustion chamber 11*a* through the intake passage 12. The air cleaner 19 removes foreign matter such as dust and dirt contained in the air. The air cleaner 19 is located at an end of the intake passage 12. The air from which foreign matter has been removed by the air cleaner 19 flows into the intake passage 12.

The main injector 14 is, for example, an electromagnetic injection valve. Ammonia gas is supplied to the main injector 14 from an ammonia gas supply unit (not shown). The main injector 14 is provided for each of multiple cylinders. For example, a four-cylinder ammonia engine system 10 includes four main injectors 14. The main injector 14 injects ammonia gas into the combustion chamber 11*a*, thereby supplying the ammonia gas to the combustion chamber 11*a*. The ammonia gas supplied to the combustion chamber 11*a* from the main injector 14 is mixed, in the combustion chamber 11*a*, with air introduced into the combustion chamber 11*a* through the intake passage 12.

The main throttle valve 15 is located in the intake passage 12. The main throttle valve 15 is, for example, an electromagnetic flow rate control valve capable of adjusting the opening degree of the intake passage 12.

The ammonia engine system 10 includes an exhaust passage 13 and an exhaust catalyst unit 16. The exhaust gas generated in the combustion chamber 11*a* is introduced from the combustion chamber 11a into the exhaust passage 13. The exhaust catalyst unit 16 is located in the exhaust passage 13. The exhaust catalyst unit 16 includes a three-way catalyst 17 and a selective catalytic reduction (SCR) catalyst 18. The three-way catalyst 17 oxidizes the ammonia gas remaining in the exhaust gas that flows through the exhaust passage 13, thereby removing the ammonia gas from the exhaust gas. The three-way catalyst 17 is activated by the heat of the exhaust gas. The SCR catalyst 18 is located downstream of the three-way catalyst 17 in the exhaust passage 13. The SCR catalyst 18 is a selective reduction catalyst. The SCR catalyst 18 reduces nitrogen oxides (NOx) contained in the exhaust gas flowing through the exhaust passage 13 to nitrogen ($N_2$) using ammonia. Further, the SCR catalyst 18 traps and removes the ammonia that has passed through the three-way catalyst 17.

The ammonia engine system 10 includes a reformer 23. The reformer 23 includes a box-shaped accommodation portion 23a. The accommodation portion 23a contains an internal space. The accommodation portion 23a includes a reforming catalyst 23b. In other words, the ammonia engine system 10 includes the reforming catalyst 23b. For example, the accommodation portion 23a may include a honeycomb-structured carrier (not shown). The reforming catalyst 23b may be provided in the accommodation portion 23a by applying the reforming catalyst 23b to the carrier. The reforming catalyst 23b functions to decompose ammonia into hydrogen and burn ammonia. The reforming catalyst 23b is, for example, an autothermal reformer (ATR) ammonia reforming catalyst. The reformer 23 uses the reforming catalyst 23b to reform ammonia gas, thereby generating reformed gas containing hydrogen.

The ammonia engine system 10 includes a reformed gas passage 31, a cooler 32, and a stop valve 33. A first end of the reformed gas passage 31 is connected to the reformer 23. A second end of the reformed gas passage 31 is connected to the intake passage 12 at a position downstream of the main throttle valve 15. The reformed gas generated by the reformer 23 is introduced into the reformed gas passage 31. The reformed gas is introduced into the intake passage 12 through the reformed gas passage 31.

The cooler 32 cools the reformed gas flowing through the reformed gas passage 31. The cooler 32 cools the reformed gas, for example, by exchanging heat between coolant flowing through the cooler 32 and the reformed gas. The reformed gas cooled by the cooler 32 is introduced into the intake passage 12 through the reformed gas passage 31. This reduces the damage to the intake system components, such as the main throttle valve 15, due to the heat of the reformed gas. As the reformed gas is cooled, the volumetric expansion of the reformed gas is suppressed, making it easier for the gas to flow from the intake passage 12 into the combustion chamber 11a.

The stop valve 33 is located downstream of the cooler 32 in the reformed gas passage 31. The stop valve 33 is, for example, an on-off valve that selectively opens and closes the reformed gas passage 31.

The ammonia engine system 10 includes a first air passage 24a, a first injector 25, and a first throttle valve 26. A first end of the first air passage 24a is connected to the intake passage 12 at a position upstream of the main throttle valve 15. A second end of the first air passage 24a is connected to the reformer 23. Some of the air introduced into the intake passage 12 through the air cleaner 19 is introduced into the first air passage 24a. Air is introduced into the reformer 23 through the first air passage 24a.

The first injector 25 is, for example, an electromagnetic injection valve. Ammonia gas is supplied to the first injector 25 from the ammonia gas supply unit (not shown). The first injector 25 supplies the ammonia gas to the first air passage 24a by injecting the ammonia gas into the first air passage 24a. The ammonia gas supplied from the first injector 25 to the first air passage 24a is introduced into the reformer 23 together with the air flowing through the first air passage 24a. As a result, the ammonia is supplied to the reforming catalyst 23b together with air.

The first throttle valve 26 is located upstream of a portion of the first air passage 24a to which ammonia gas is supplied from the first injector 25. The first throttle valve 26 is, for example, an electromagnetic flow rate control valve capable of adjusting the opening degree of the first air passage 24a.

The ammonia engine system 10 includes a second air passage 24b, a chamber 27, a second injector 28, a second throttle valve 29, and a combustor 40. A first end of the second air passage 24b is connected to the first air passage 24a on the upstream side of the first throttle valve 26. A second end of the second air passage 24b is connected to the chamber 27. Some of the air flowing through the first air passage 24a is introduced into the second air passage 24b. The chamber 27 has a box-shaped structure, with a space formed inside. The air is introduced into the internal space of chamber 27 through the second air passage 24b.

The second injector 28 is, for example, an electromagnetic injection valve. Ammonia gas is supplied to the second injector 28 from the ammonia gas supply unit (not shown). The second injector 28 supplies the ammonia gas to the space in the chamber 27 by injecting the ammonia gas into the space in the chamber 27. The air introduced from the second air passage 24b into the chamber 27 and the ammonia gas supplied from the second injector 28 into the chamber 27 are mixed in the chamber 27. As a result, the ammonia gas mixed with the air is generated in the chamber 27. The ammonia gas mixed with the air is introduced into the combustor 40 from the chamber 27.

The second throttle valve 29 is located in the second air passage 24b. The second throttle valve 29 is, for example, an electromagnetic flow rate control valve capable of adjusting the opening degree of the second air passage 24b.

The combustor 40 generates combustion gas by burning ammonia mixed with air. The combustion gas generated by the combustor 40 is introduced into the reformer 23.

Figure 2:
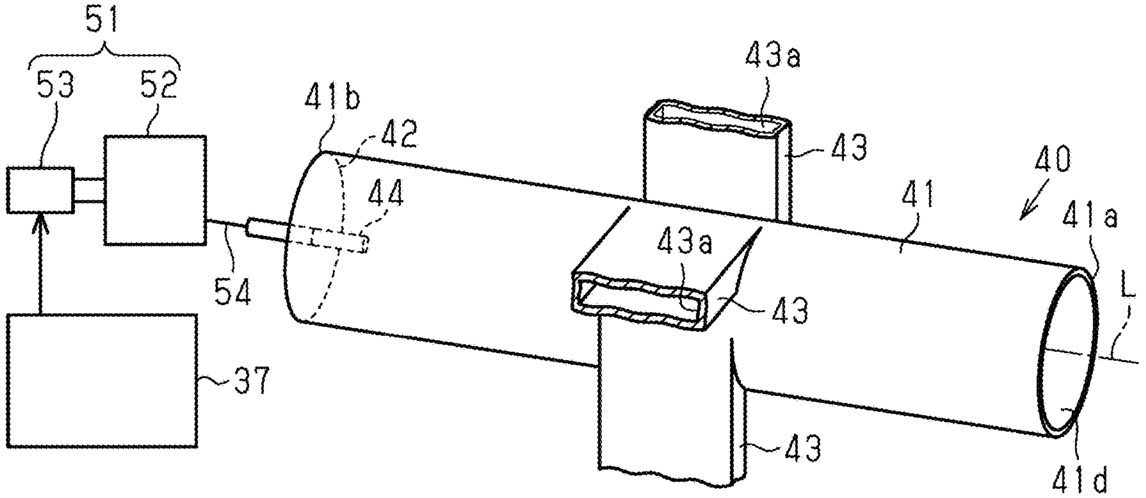
FIG. 2 is a schematic diagram illustrating the combustor, the ignition plug, and the ignition unit included in the ammonia engine system shown in FIG. 1.

As shown in FIG. 2, the combustor 40 includes a tubular housing 41. The housing 41 includes a first end 41a, which is open. The housing 41 includes a second end 41b having a closing wall 42. The closing wall 42 is, for example, disk-shaped. The closing wall 42 closes the second end 41b of the housing 41. The housing 41 and the closing wall 42 are made of a conductive metal material. The conductive metal material is, for example, stainless steel.

As shown in FIGS. 1 and 2, the combustor 40 includes inlets 43. Each inlet 43 includes, for example, a tubular passage 43a. The inlet 43 has a first end connected to the chamber 27 and a second end connected to the housing 41. In the cross-section orthogonal to an axis L of the housing 41, each inlet 43 is connected to the housing 41 such that, for example, the passage 43a of the inlet 43 extends in the tangent direction of an inner circumferential surface 41d of the housing 41. The inlet 43 may be formed integrally with the housing 41. Alternatively, the inlet 43 may be formed separately from the housing 41 and fixed to the housing 41.

The ammonia gas mixed with air is introduced from the interior of the chamber 27 into the passage 43a of the inlet 43. The ammonia gas mixed with the air is introduced into the housing 41 through the passage 43*a*. The ammonia gas and the air introduced into the housing 41 from the inlet 43 flow in the circumferential direction of the housing 41 along the inner circumferential surface 41*d* of the housing 41. This creates a tubular flow in the housing 41 along the inner surface of the housing 41.

As shown in FIG. 2, the combustor 40 includes an ignition plug 44 and an ignition unit 51. The ignition plug 44 is located at the second end 41*b* in the housing 41. The ignition unit 51 includes an igniter 52 and a power supply 53. The power supply 53 selectively turns on and off the igniter 52. The igniter 52 is connected to the ignition plug 44 via the electric wire 54. The igniter 52 supplies a pulse voltage to the ignition plug 44 via the electric wire 54.

When a relatively high voltage is applied to the ignition plug 44 by the igniter 52, the spark generated by the ignition plug 44 ignites the ammonia gas in the housing 41. Then, the ammonia gas burns, thereby producing a flame. When the ammonia gas burns, combustion gas is generated in the housing 41. The flame grows inside the housing 41. The growth of the flame promotes the generation of combustion gas resulting from the combustion of the ammonia gas in the housing 41. The combustion gas is introduced into the reformer 23 from the first end 41*a* of the housing 41.

As shown in FIG. 1, the ammonia engine system 10 includes a controller 37, and various switches and sensors used to detect different states of the vehicle 50. The various switches and sensors are connected to the controller 37. The controller 37 may be circuitry including: 1) one or more processors that operate according to a computer program (software); 2) one or more dedicated hardware circuits (application-specific integrated circuits: ASICs) that execute at least part of various processes; or 3) a combination thereof. The processor may include a CPU and a memory such as a RAM and a ROM. The memory may store program codes or commands configured to cause the CPU to execute processes. The memory, or a computer-readable medium, includes any type of media that are accessible by general-purpose computers and dedicated computers.

Examples of the switches include an ignition switch 55. When the ignition switch 55 is operated by the driver of the vehicle 50, the ignition switch 55 outputs an operation signal. Examples of the sensors include a temperature sensor 56, a crank position sensor 57, and a cam position sensor 58. The temperature sensor 56 detects the temperature of the reformer 23. The crank position sensor 57 is located in the vicinity of a crankshaft (not shown). As the crankshaft rotates, the crank position sensor 57 outputs a pulse signal at each predetermined rotation angle. The cam position sensor 58 is located in the vicinity of an intake camshaft (not shown). Each time the rotation phase of the intake camshaft reaches a predetermined phase, the cam position sensor 58 outputs a pulse signal.

Combustion Reaction in Reformer

As shown in FIG. 1, air and ammonia gas are introduced into the reformer 23 from the first air passage 24*a*, and combustion gas is introduced into the reformer 23 from the combustor 40. The reforming catalyst 23*b* is warmed up by the combustion gas. As a result, an ammonia combustion reaction occurs in the reformer 23, where the ammonia gas chemically reacts with oxygen from the air, as represented by the following expression 1.

$$NH_3 + 3/4O_2 \text{ -> } 3/2H_2O + 1/2N_2 + Q \qquad \text{(Expression 1)}$$

Using the combustion reaction of ammonia, the reformer 23 generates a gas mixture containing moisture ($H_2O$) and nitrogen ($N_2$). The temperature of the reformer 23 is increased by the combustion heat generated by the combustion reaction of ammonia.

Reforming Reaction in Reformer

When the temperature of the reformer 23 reaches a temperature at which reforming is possible, the reforming catalyst 23*b* starts reforming ammonia gas. The temperature at which reforming is possible is, for example, approximately 300° C. to 400° C. During ammonia gas reforming, for example, a reforming reaction occurs in the reformer 23, where ammonia is decomposed into hydrogen ($H_2$) and nitrogen by combustion heat, as represented by the following Expression 2.

$$NH_3 \text{ -> } 3/2H_2 + 1/2N_2 - Q \qquad \text{(Expression 2)}$$

Using this reforming reaction, the reformer 23 generates reformed gas containing hydrogen and nitrogen. The reformed gas is discharged from the reforming catalyst 23*b*. That is, the hydrogen contained in the reformed gas is discharged from the reforming catalyst 23*b*. The reformed gas is introduced from the reformer 23 into the reformed gas passage 31, and then introduced into the intake passage 12 through the reformed gas passage 31.

Supply of Reformed Gas to Combustion Chamber

The reformed gas introduced into the intake passage 12 from the reformed gas passage 31 is supplied to the combustion chamber 11*a* of the ammonia engine 11 from the intake passage 12. That is, the ammonia engine 11 is supplied with the hydrogen discharged from the reforming catalyst 23*b*. The reformed gas is supplied to the combustion chamber 11*a* together with the air in the intake passage 12. The ammonia gas supplied from the main injector 14 to the combustion chamber 11*a* and the hydrogen in the reformed gas are mixed in the combustion chamber 11*a*, making it easier for the ammonia gas to burn in the combustion chamber 11*a*. In the combustion chamber 11*a*, the ammonia gas burns together with the hydrogen in the reformed gas.

Controller

The controller 37 may include, for example, a CPU, a RAM, a ROM, and an input-output interface. The controller 37 executes various controls of the ammonia engine system 10 based on signals output from the ignition switch 55, the temperature sensor 56, the crank position sensor 57, and the cam position sensor 58. The controller 37 controls the main injector 14, the main throttle valve 15, the first injector 25, the first throttle valve 26, the second injector 28, the second throttle valve 29, the stop valve 33, the power supply 53, and the like.

When the ignition switch 55 is turned on, power is supplied to the controller 37. As a result, the controller 37 performs a startup control to initiate the ammonia engine 11. When the ignition switch 55 is turned off during the operation of the ammonia engine 11, the controller 37 executes a stop control to cease the operation of the ammonia engine 11. When the operation of the ammonia engine 11 is stopped by executing the stop control, the supply of power to the controller 37 is interrupted.

In the startup control, the controller 37 controls a starter motor (not shown) to crank the ammonia engine 11. Further, in the startup control, the controller 37 opens the main throttle valve 15, the first throttle valve 26, the second throttle valve 29, and the stop valve 33.

Cylinder Identification Process

In the startup control, the controller 37 executes a cylinder identification process that performs cylinder identification. That is, the controller 37 executes the cylinder identification process at the startup of the ammonia engine 11. In the cylinder identification process, the controller 37 determines for each cylinder whether it corresponds to the intake stroke, the compression stroke, the combustion stroke, or the exhaust stroke, based on pulse signals output from the crank position sensor 57 and the cam position sensor 58. Once the controller 37 identifies the optimal cylinder for initiating combustion in the combustion chamber 11*a* based on the determination result, the cylinder identification process is terminated.

Combustion Process

In the startup control, the controller 37 executes a combustion process that generates combustion gas in the combustor 40. In other words, the controller 37 executes the combustion process at the startup of the ammonia engine 11. In the combustion process, the controller 37 injects ammonia gas from the second injector 28, and controls the power supply 53 to turn on the igniter 52, thereby generating combustion gas in the combustor 40.

The controller 37 determines whether the temperature of the reformer 23 is greater than or equal to a specified temperature based on the detection value from the temperature sensor 56. The specified temperature is a temperature at which ammonia gas can be burned, and is, for example, approximately 200° C. When determining that the temperature of the reformer 23 is greater than or equal to the specified temperature, the controller 37 terminates the combustion process. At the end of the combustion process, the controller 37 stops injecting ammonia gas from the second injector 28 and closes the second throttle valve 29. This stops the introduction of the air and the ammonia gas supplied from the chamber 27 to the combustor 40. At the end of the combustion process, the controller 37 controls the power supply 53, so that the power supply 53 turns off the igniter 52. When the combustion of the ammonia gas in the combustor 40 is stopped, the introduction of the combustion gas from the combustor 40 to the reformer 23 is stopped.

Supplying Process

In the startup control, the controller 37 executes the supplying process. Specifically, the controller 37 executes the supplying process at the startup of the ammonia engine 11. In the supplying process, the controller 37 injects ammonia gas from the first injector 25. During the execution of the supplying process, the first throttle valve 26 is open, so that air is introduced into the reformer 23 from the first air passage 24*a*. Thus, in the supplying process, the controller 37 supplies ammonia together with air to the reforming catalyst 23*b*. When the supplying process is executed, the combustion reaction and reforming reaction occur in the reformer 23. As a result, the reformed gas containing hydrogen is discharged from the reforming catalyst 23*b*.

Operation of Ammonia Engine

In the startup control, the controller 37 initiates the operation of the ammonia engine 11 by sequentially starting combustion in all cylinders, beginning with the cylinder that is determined to be optimal for initiating combustion through the cylinder identification process. The controller 37 initiates the operation of the ammonia engine 11 by controlling injection from the main injector 14 and ignition by an ignition device (not shown) for each cylinder.

While the ammonia engine 11 is operating, the controller 37 may perform at least one of adjustment of the opening degree of the main throttle valve 15 and modification of the injection timing of the main injector 14. In the stop control, the controller 37 stops the injection of ammonia gas from the main injector 14 and the first injector 25. In the stop control, the controller 37 closes the main throttle valve 15, the first throttle valve 26, and the stop valve 33. As a result, the ammonia engine 11 is stopped.

Processing Procedure for Startup Control

An example of the processing procedure for the startup control performed by the controller 37 will now be described with reference to FIG. 3. The controller 37 initiates the startup control on the condition that the ignition switch 55 has been turned on.

Figure 3:
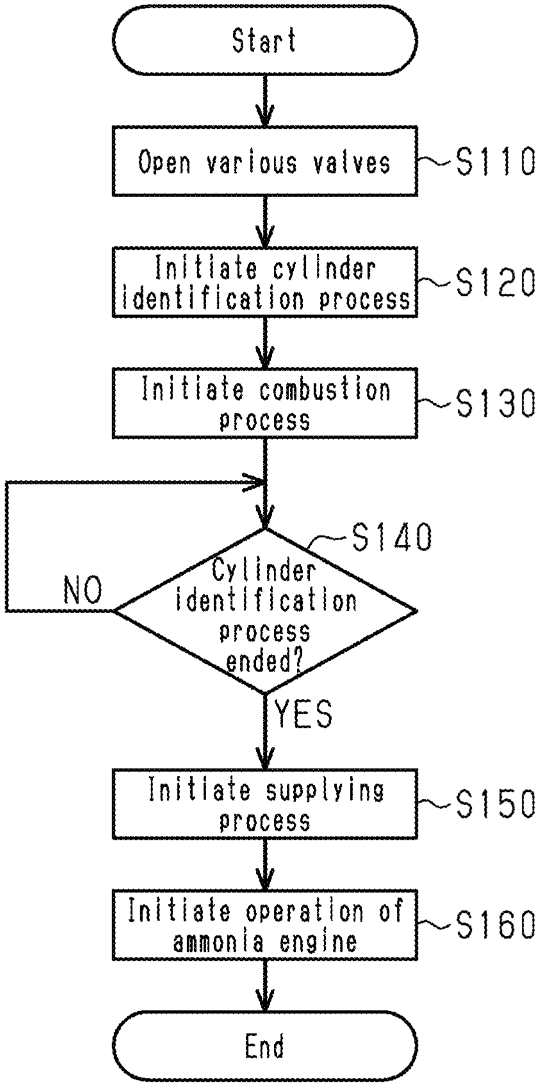
FIG. 3 is a flowchart illustrating a processing procedure for the startup control in the ammonia engine system shown in FIG. 1.

As shown in FIG. 3, when the startup control is initiated, the controller 37 opens multiple valves (step S110). In step S110, the controller 37 opens the main throttle valve 15, the first throttle valve 26, the second throttle valve 29, and the stop valve 33. Subsequently, the controller 37 initiates the cylinder identification process (step S120) and then initiates the combustion process (step S130).

Next, the controller 37 determines whether the cylinder identification process has been ended (step S140). The controller 37 repeatedly executes the process of step S140 as long as it determines that the cylinder identification process has not been ended (step S140: NO). When determining that the cylinder identification process has been ended (step S140: YES), the controller 37 initiates the supplying process (step S150). Subsequently, the controller 37 initiates the operation of the ammonia engine 11 (step S160) and ends the startup control.

Relationship Between Cylinder Identification Process and Throttle Valve

Figure 4:
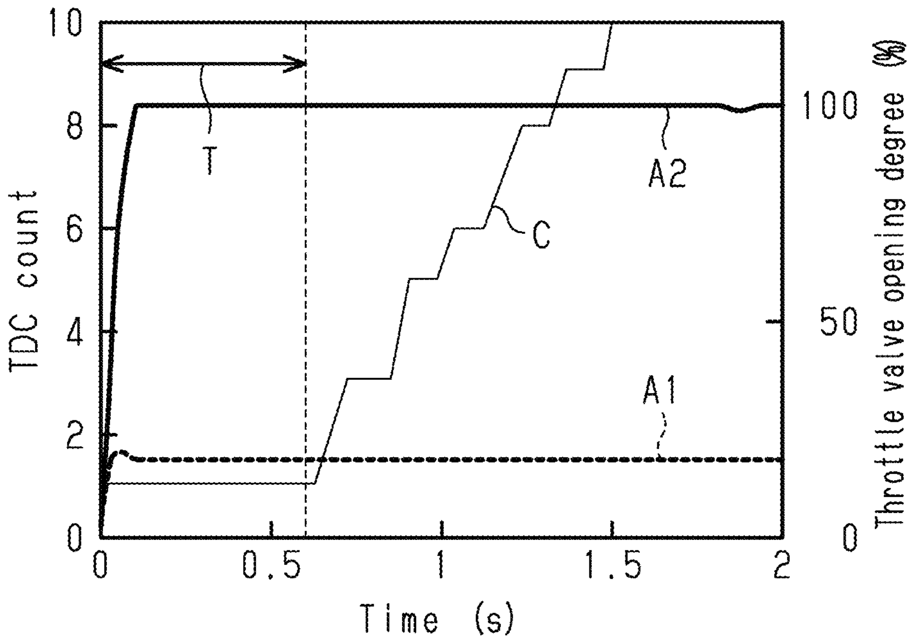
FIG. 4 is a graph illustrating the relationship between the TDC count, the throttle valve opening degree, and the time.

FIG. 4 illustrates an example of the relationship between a TDC count C, an opening degree A1 of the first throttle valve 26, an opening degree A2 of the second throttle valve 29, and time. The TDC count C is a numerical value that correlates with the rotation speed of the ammonia engine 11. For example, when the ammonia engine 11 completes one revolution, the TDC count C increases by 1. In the example shown in FIG. 4, time zero (0) indicates the point at which the controller 37 initiates the startup control as the ignition switch 55 is turned on.

Referring to FIG. 4, upon initiating the startup control, the controller 37 initiates the cylinder identification process and opens the first throttle valve 26 and the second throttle valve 29. The controller 37 executes the cylinder identification process during an execution period T. In the example shown in FIG. 4, the controller 37 controls each of the first throttle valve 26 and the second throttle valve 29 such that the opening degree A2 of the second throttle valve 29 becomes larger than the opening degree A1 of the first throttle valve 26.

In the example shown in FIG. 4, even after the controller 37 ends the cylinder identification process, the first throttle valve 26 and the second throttle valve 29 remain open. When the cylinder identification process by the controller 37 ends, the controller 37 initiates the supplying process and the operation of the ammonia engine 11. Consequently, as the ammonia engine 11 rotates, the TDC count C increases.

Relationship Between Cylinder Identification Process and Injector

Figure 5:
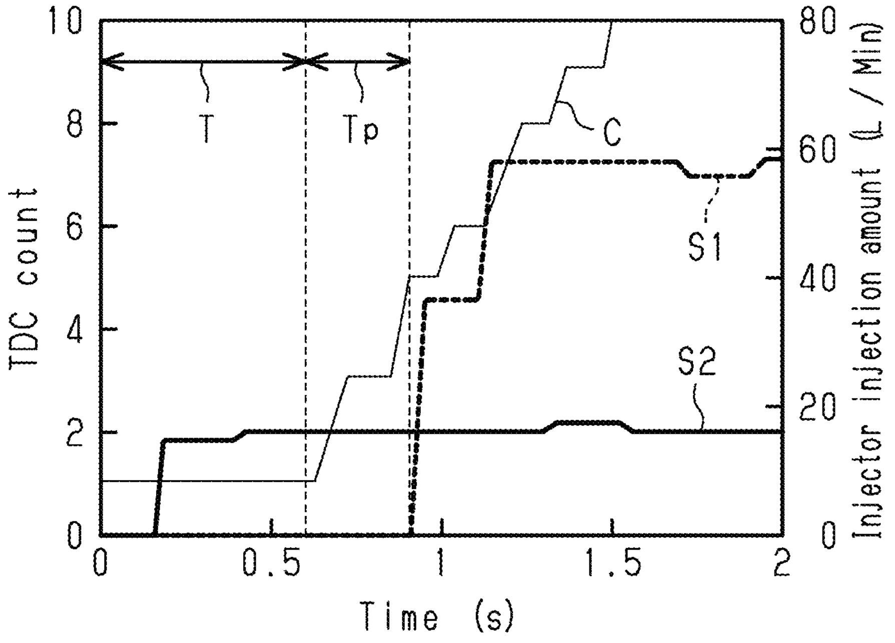
FIG. 5 is a graph illustrating the relationship between the TDC count, the amount of injection from the injector, and the time.

FIG. 5 illustrates an example of the relationship between the TDC count C, an injection amount S1 from the first injector 25, an injection amount S2 from the second injector 28, and time. In the same manner as FIG. 4, in the example shown in FIG. 5, time zero (0) indicates the point at which the controller 37 initiates the startup control as the ignition switch 55 is turned on.

Referring to FIG. 5, upon initiating the startup control, the controller 37 initiates the cylinder identification process, and initiates injection from the second injector 28 by executing the combustion process. The injection from the second injector 28 begins during the execution period T of the cylinder identification process. That is, the controller 37 initiates the combustion process while executing the cylinder identification process. In the example shown in FIG. 5, even after the cylinder identification process by the controller 37 ends, the injection from the second injector 28 continues.

The controller 37 initiates the injection from the first injector 25 by executing the supplying process after the startup of injection from the second injector 28, which is associated with the combustion process. That is, the controller 37 initiates the supplying process after the combustion process has begun. In the present embodiment, the start point of injection from the first injector 25 occurs after a predetermined period Tp from the execution period T of the cylinder identification process. That is, the controller 37 initiates the fuel supplying process after the cylinder identification process has ended. The controller 37 initiates the supplying process after the predetermined period Tp has elapsed following the end of the cylinder identification process. In the example shown in FIG. 5, the controller 37 controls each of the first injector 25 and the second injector 28 such that the injection amount S1 from the first injector 25 becomes greater than the injection amount S2 from the second injector 28.

Relationship Between Start Point of Supplying Process and Startup Time

Figure 6:
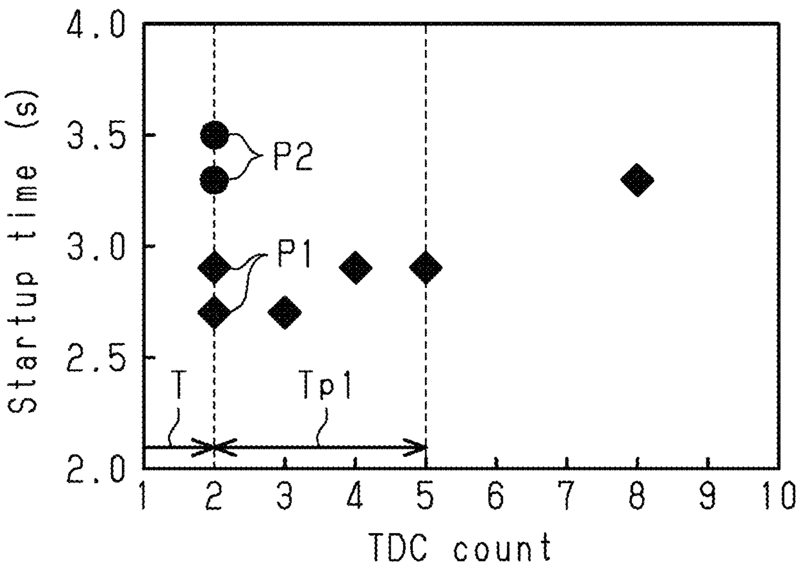
FIG. 6 is a graph illustrating the measurement results of the startup time.

As shown in FIG. 6, startup times were measured for each instance where the start point of the supplying process by the controller 37 was altered in the ammonia engine system 10. The startup time refers to the duration from when the ignition switch 55 is turned on to when the ammonia engine 11 starts operating. Under the condition that the cylinder identification process was executed when the TDC count C is between 1 and 2, the startup time was measured. Further, the startup time was measured under the condition that the main throttle valve 15, the first throttle valve 26, the second throttle valve 29, and the stop valve 33 were opened when the TDC count C was 1.

A first measurement value P1 indicates the startup time that was measured when the combustion process was initiated with a TDC count C of 1. The first measurement value P1 was obtained by measuring the corresponding startup time for each case, varying the start point of the supplying process with the TDC count C ranging from 2 to 8. Additionally, a second measurement value P2 was measured as a comparative example to the first measurement value P1. The second measurement value P2 is the start time measured when the combustion process and the supplying process are initiated by the controller 37 at a TDC count C of 2.

The comparison between the first measurement value P1 and the second measurement value P2, when the supplying process begins at a TDC count C of 2, reveals that the first measurement value P1 is smaller than the second measurement value P2. This indicates that delaying the start point of the supplying process from the start point of the combustion process results in a shorter startup time.

When the supplying process is initiated between TDC counts C of 2 and 5, the first measurement value P1 is smaller than the second measurement value P2. When the supplying process was initiated at a TDC count C of 8, the first measurement value P1 was approximately equal to the second measurement value P2. In FIG. 6, the predetermined period Tp before the initiation of the supplying process after the end of the cylinder identification process is set to be equal to or less than the period Tp1. The period Tp1 of the present embodiment corresponds to the period from 2 to 5 of the TDC count C, and is a period during which a reduction in startup time can be expected. If the predetermined period Tp is longer than the period Tp1, the startup time is approximately the same as when the combustion process and the supplying process are initiated simultaneously immediately after the end of the cylinder identification process.

Figure 7:
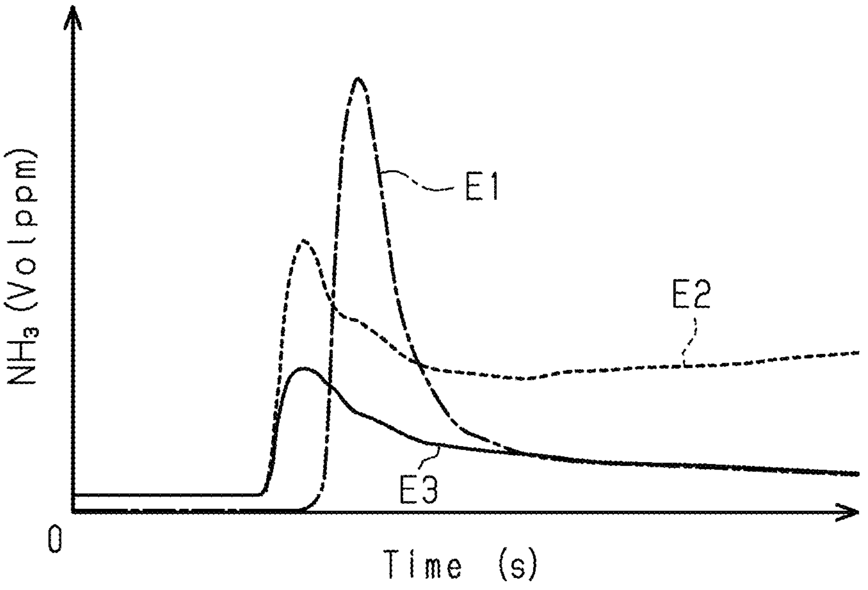
FIG. 7 is a graph illustrating the volume of ammonia discharged from the reforming catalyst.

Relationship between Start Timing of Combustion Process and Supplying Process with Ammonia Discharge Volume As shown in FIG. 7, the volume of ammonia gas discharged from the reformer 23 to the reformed gas passage 31 was measured by varying the start timing of the combustion process and the supplying process. A first discharge volume E1 refers to the discharge volume of the above-described ammonia gas in a case in which the combustion process and the supplying process begin simultaneously after the end of the cylinder identification process. A second discharge volume E2 refers to the discharge volume of the ammonia gas in a case in which the combustion process begins during the execution of the cylinder identification process and the supplying process begins immediately after the end of the cylinder identification process. A third discharge volume E3 refers to the discharge volume of the ammonia gas in a case in which the combustion process begins during the execution of the cylinder identification process and the supplying process begins at the point in time when the TDC count C increases by 1 after the end of the cylinder identification process. The start timing of the combustion process during the cylinder identification process is the same as when measuring the second discharge volume E2 and when measuring the third discharge volume E3.

As shown in FIG. 7, the second discharge volume E2 and the third discharge volume E3 are less than the first discharge volume E1. This indicates that delaying the start point of the supplying process from the start point of the combustion process results in a reduction of the discharge volume of ammonia gas from the reformer 23 to the reformed gas passage 31.

Additionally, the third discharge volume E3 is less than the second discharge volume E2. This indicates that initiating the supplying process a certain amount of time after the end of the cylinder identification process, rather than initiating the supplying process immediately after the end of the cylinder identification process, results in a reduction of the discharge volume of ammonia gas from the reformer 23 to the reformed gas passage 31. Based on these measurement results, in the present embodiment, the predetermined period Tp from the end of the cylinder identification process to the beginning of the fuel supplying process is set to the period from when the cylinder identification process ends to the TDC count C increases by 1.

Operation of Embodiment

The operation of the present embodiment will now be described.

Referring to FIG. 1, the controller 37 initiates the combustion process while executing the cylinder identification process, and initiates the supplying process after the combustion process has begun. Specifically, the controller 37 initiates the combustion process prior to the supplying process. When the combustion process begins, the injection of ammonia gas from the second injector 28 begins. As a result, ammonia gas mixed with air is supplied to the combustor 40, and combustion gas is generated in the combustor 40. The combustion gas generated is introduced from the combustor 40 into the reformer 23. The reforming catalyst 23*b* is warmed up by the combustion gas introduced into the reformer 23. Thus, the warm-up of the reforming catalyst 23*b* is initiated before the supplying process is performed.

When the controller 37 initiates the supplying process, the injection of ammonia gas from the first injector 25 begins. As a result, ammonia gas is supplied to the reforming catalyst 23*b* together with air. In this state, since the warm-up of the reforming catalyst 23*b* by the combustion gas progresses, the time required for the reforming reaction to occur in the reforming catalyst 23*b* is shortened.

When the reforming catalyst 23*b* is warmed up to a temperature at which reforming is possible, the reformer 23 produces reformed gas containing hydrogen and nitrogen through the reforming reaction in the reforming catalyst 23*b*. The reformed gas is supplied to the combustion chamber 11*a* of the ammonia engine 11 through the reformed gas passage 31 and the intake passage 12 from the reforming catalyst 23*b*. The ammonia gas supplied from the main injector 14 to the combustion chamber 11*a* burns in the combustion chamber 11*a* together with the hydrogen in the reformed gas.

Advantages of Embodiment

The above-described embodiment has the following advantages.

(1) The controller 37 performs the combustion process, which generates combustion gas in the combustor 40, and the supplying process, which supplies ammonia together with air to the reforming catalyst 23*b*, at the startup of the ammonia engine 11. The controller 37 initiates the supplying process after the combustion process has begun. Thus, after the warm-up of the reforming catalyst 23*b* is initiated by the combustion gas, ammonia is supplied to the reforming catalyst 23*b* together with air. As a result, compared to a case in which the combustion process and the supplying process are initiated simultaneously, the time during which the supplying process is executed before the reforming catalyst 23*b* reaches a temperature at which reforming is possible is shorter. Accordingly, the time during which ammonia is discharged from the reforming catalyst 23*b* without contributing to the reforming reaction in the reforming catalyst 23*b* is shortened, thereby reducing the volume of ammonia discharged from the reforming catalyst 23*b*.

(2) The controller 37 executes the cylinder identification process, which performs cylinder identification, at the startup of the ammonia engine 11. Further, the controller 37 initiates the combustion process during the execution of the cylinder identification process. Furthermore, the controller 37 initiates the supplying process after the cylinder identification process has ended. Thus, compared to a case in which the combustion process and the supplying process are initiated during the execution of the cylinder identification process, the time from the start of the combustion process to the start of the supplying process is longer. Since the warm-up of the reforming catalyst 23*b* further progresses before the start of the supplying process, the time during which the supplying process is executed before the reforming catalyst 23*b* reaches a temperature at which reforming is possible is even shorter. This further reduces the volume of ammonia discharged from the reforming catalyst 23*b*.

(3) The controller 37 starts the supplying process after the predetermined period Tp has elapsed following the end of the cylinder identification process. Thus, compared to a case in which the supplying process is initiated immediately after the end of the cylinder identification process, the time from the start of the combustion process to the start of the supplying process is longer. Since the warm-up of the reforming catalyst 23*b* further progresses before the start of the supplying process, the time during which the supplying process is executed before the reforming catalyst 23*b* reaches a temperature at which reforming is possible is even shorter. This further reduces the volume of ammonia discharged from the reforming catalyst 23*b*.

(4) The controller 37 initiates the combustion process while executing the cylinder identification process, and initiates the supplying process after the cylinder identification process has ended. The predetermined period Tp from the end of the cylinder identification process by the controller 37 to the start of the supplying process is set to be less than or equal to the period Tp1. As a result, compared to a case in which the combustion process and the supplying process are initiated immediately after the end of the cylinder identification process, the time during which the supplying process is executed before the reforming catalyst 23*b* reaches a temperature at which reforming is possible is shorter. Since hydrogen is discharged from the reforming catalyst 23*b* at an earlier stage after the start of the supplying process, hydrogen is supplied to the ammonia engine 11 from the reforming catalyst 23*b* at an earlier stage. This shortens the startup time of the ammonia engine 11.

Modifications

The above-described embodiment may be modified as follows. The above-described embodiment and the following modifications can be combined if the combined modifications remain technically consistent with each other.

The predetermined period Tp from the end of the cylinder identification process by the controller 37 to the start of the supplying process may be greater than the period Tp1.

The controller 37 may initiate the supplying process after the predetermined period Tp or greater has elapsed following the end of the cylinder identification process.

The period from the end of the cylinder identification process by the controller 37 to the start of the supplying process may be less than the predetermined period Tp. For example, the controller 37 may initiate the supplying process immediately after the cylinder identification process has ended. In this case, in the same manner as the above, the controller 37 initiates the supplying process after the cylinder identification process has ended.

The controller 37 may initiate the combustion process and the supplying process while executing the cylinder identification process. That is, the controller 37 only needs to initiate the combustion process while executing the cylinder identification process and initiate the supplying process after the combustion process has begun.

The controller 37 may initiate the combustion process and the supplying process after the cylinder identification process has ended. That is, the controller 37 only needs to initiate the supplying process after the combustion process has begun.

The controller 37 may, in addition to controlling the second injector 28 and the power supply 53, perform control to open the second throttle valve 29 during the combustion process. In this case, the controller 37 does not open the second throttle valve 29 in step S110 in FIG. 3, but opens the second throttle valve 29 in step S130.

The controller 37 may control each of the first throttle valve 26 and the second throttle valve 29 such that the opening degree A1 of the first throttle valve 26 becomes greater than the opening degree A2 of the second throttle valve 29 during startup control. The controller 37 may control each of the first throttle valve 26 and the second throttle valve 29 such that the opening degree A1 of the first throttle valve 26 becomes equal to the opening degree A2 of the second throttle valve 29 during the startup control.

The controller 37 may control each of the first injector 25 and the second injector 28 such that the injection amount S2 from the second injector 28 becomes greater than the injection amount S1 from the first injector 25 during the startup control. The controller 37 may control each of the first injector 25 and the second injector 28 such that the injection amount S1 from the first injector 25 becomes equal to the injection amount S2 from the second injector 28 during the startup control.

The controller 37 may generate combustion gas in the combustor 40 by introducing air and ammonia separately into the combustor 40 during the combustion process. In this case, for example, some of the inlets 43 may introduce only ammonia gas into the housing 41, and the other inlets 43 may introduce only air into the housing 41.

The number of the inlets 43 of the combustor 40 may be three or less or may be five or more. That is, the combustor 40 may have at least one inlet 43. The phrase "at least one of" as used in this description means "one or more" of a desired choice. For example, the phrase "at least one of" as used in this description means "only one choice" or "both of two choices" if the number of choices is two. In another example, the phrase "at least one of" as used in this description means "only one single choice" or "any combination of two or more choices" if the number of its choices is three or more.

The combustor 40 only needs to be able to generate combustion gas by burning ammonia mixed with air. For example, the housing 41 of the combustor 40 may have a tubular shape that is not cylindrical. For example, in the cross-section that is orthogonal to the axis L of the housing 41, the inlets 43 of the combustor 40 may be connected to the housing 41 such that the passage 43*a* extends in a direction different from the tangential direction of the inner circumferential surface 41*d* of the housing 41.

The first air passage 24*a* does not need to be connected to the intake passage 12. In this case, for example, air may flow into the first air passage 24*a* from a route that is different from the intake passage 12.

The main injector 14 may inject ammonia gas into intake ports that lead to the combustion chamber 11*a* of each cylinder.

The ammonia engine system 10 may be employed in a hybrid electric vehicle 50.

The invention claimed is:

1. An ammonia engine system, comprising:

a combustor configured to generate combustion gas by burning ammonia mixed with air;

a reformer into which the combustion gas generated in the combustor is introduced;

a reforming catalyst arranged in the reformer, the reforming catalyst being configured to be warmed up by the combustion gas;

an ammonia engine configured to be supplied with hydrogen that is discharged from the reforming catalyst;

an intake passage configured to introduce air into the ammonia engine;

a first air passage having a first end that introduces the air and a second end connected to the reformer;

a first injector configured to inject ammonia gas into the first air passage;

a second air passage having a first end and a second end, the first end of the second air passage being connected to the first air passage at a position upstream of the first injector, and the second end of the second air passage being connected to the reformer;

a second injector configured to supply the ammonia gas to the combustor through the second air passage; and a controller configured to, during startup of the ammonia engine, execute:

a combustion process that causes the combustor to generate the combustion gas by causing the second injector to inject the ammonia gas; and a supplying process that supplies the reforming catalyst with ammonia together with air in the reformer by causing the first injector to inject the ammonia gas, wherein the controller is configured to initiate the supplying process after warm-up of the reforming catalyst has been started by initiating the combustion process.

2. The ammonia engine system according to claim 1, wherein the controller is configured to:

execute a cylinder identification process that performs cylinder identification at startup of the ammonia engine;

initiate the combustion process while executing the cylinder identification process; and initiate the supplying process after the cylinder identification process has ended.

3. The ammonia engine system according to claim 2, wherein the controller is configured to initiate the supplying process after a predetermined period or greater has elapsed following the end of the cylinder identification process.

4. The ammonia engine system according to claim 1, comprising a chamber to which the second end of the second air passage is connected, wherein the second injector is configured to inject the ammonia gas into a space in the chamber, and the chamber is configured to introduce the ammonia gas mixed with air in the chamber into the combustor.

* * * * *